US012710936B1

(12) United States Patent
Sedat et al.

(10) Patent No.: US 12,710,936 B1
(45) Date of Patent: Aug. 18, 2026

(54) INFERRED DEPENDENCIES BETWEEN RESOURCES IN AN APPLICATION PROGRAMMING INTERFACE

(71) Applicant: Black Duck Software, Inc., Burlington, MA (US)

(72) Inventors: Benjamin D. Sedat, San Francisco, CA (US); Shane Wilton, Mountain View, CA (US); Kavin Anantha Subramanyam, Sunnyvale, CA (US)

(73) Assignee: Black Duck Software, Inc., Burlington, MA (US)

( * ) Notice: Subject to any disclaimer, the term of this patent is extended or adjusted under 35 U.S.C. 154(b) by 261 days.

(21) Appl. No.: 18/228,576

(22) Filed: Jul. 31, 2023

Related U.S. Application Data

(60) Provisional application No. 63/395,172, filed on Aug. 4, 2022.

(51) Int. Cl.
*G06F 8/36* (2018.01)
*G06F 8/41* (2018.01)

(52) U.S. Cl.
CPC ................ *G06F 8/36* (2013.01); *G06F 8/433* (2013.01)

(58) Field of Classification Search
None
See application file for complete search history.

(56) References Cited

U.S. PATENT DOCUMENTS

2019/0384617 A1* 12/2019 Jain ......................... G06F 9/547
2019/0384856 A1* 12/2019 Liu ....................... G06F 40/284
2020/0133744 A1* 4/2020 MacLeod ................ G06F 9/541
2021/0055977 A1* 2/2021 Lisuk .................... H04L 67/133
2023/0115438 A1* 4/2023 DeGraaf ................ G06F 9/547 707/652

OTHER PUBLICATIONS

Kim et al., "Automated Test Generation for REST APIs: No Time to Rest Yet," ACM, 2022. (Year: 2022).*
Lin et al., "foREST: A Tree-based Approach for Fuzzing RESTful APIs," ACM, 2022. (Year: 2022).*
Liu et al., "MOREST: Model-based RESTful API Testing with Execution Feedback," IEEE/ACM, 2022. (Year: 2022).*
Atlidakis et al., "REST-ler: Automatic Intelligent REST API Fuzzing" Apr. 2018, 11 pages.

* cited by examiner

*Primary Examiner* — Ryan D. Coyer
(74) *Attorney, Agent, or Firm* — Lowenstein Sandler LLP

(57) ABSTRACT

A processing device identifies a set of available endpoints published by an application programming interface (API) of a computing server, determines one or more dependencies between the available endpoints, and generates an executable operation comprising a subset of the available endpoints to be called in a given order based on the one or more dependencies.

18 Claims, 5 Drawing Sheets

INFERRED DEPENDENCIES BETWEEN RESOURCES IN AN APPLICATION PROGRAMMING INTERFACE

RELATED CASES

This application claims the benefit of U.S. Provisional Patent Application No. 63/395,172, filed Aug. 4, 2022, the entire contents of which are hereby incorporated by reference herein.

TECHNICAL FIELD

The present disclosure relates to the field of software security scanning, and in particular to inferred dependencies between resources in an application programming interface (API).

BACKGROUND

An application can be thought of as a three-layered stack comprised of a web server layer, an application logic layer, and a persistent state layer. An API (Application Programming Interface) is an interface between a client and server that communicate using a medium such as HTTP messages. The application maintains state in the form of a collection of discrete objects. The basic unit of state is a single object. An object could be, for example, a row in a table in a relational database or a single document in a document database. Objects can be linked to one another, representing ownership or another form of business logic link. Typically, links are represented in the output of an API by embedding another object/resource or providing a linking unique identifier such as a numerical ID. Furthermore, objects with a similar shape, as defined by the fields in the schema, can be grouped as resources. The shared structure of objects representing a specific resource allows for grouping and categorization.

In a REST (Representational State Transfer), API objects are used to communicate server state to a client. The boundaries and lifecycles of a resource, however, are not clear from API documentation such as with the OpenAPI Specification. A resource could be embedded within another resource for certain API requests or responses, could be on its own in other requests or responses, or could simply be referenced by an identifier. To be able to successfully query for a specific object, the corresponding identifier must be known, and previously this initial state must be explicitly provided by a user.

SUMMARY

A processing device identifies a set of available endpoints published by an application programming interface (API) of a computing server, determines one or more dependencies between the available endpoints, and generates an executable operation comprising a subset of the available endpoints to be called in a given order based on the one or more dependencies.

In one embodiment, the set of available endpoints published by the API is received in response to a query of a corresponding API specification. Each of the one or more dependencies represents a first endpoint of the set of available endpoints which is configured to provide a certain parameter value in response to a first request and a second endpoint of the set of available endpoints which is configured to receive a second request including the parameter value.

In one embodiment, determining the one or more dependencies between the available endpoints comprises sending a series of probe requests to the set of available endpoints, and storing parameter values received in responses to the series of probe requests in a resource graph of a knowledge base. In another embodiment, determining the one or more dependencies between the available endpoints comprises using a number of heuristics related to the set of available endpoints. In another embodiment, determining the one or more dependencies between the available endpoints comprises applying a corresponding API specification as an input to a trained machine learning model and receiving an output of the trained machine learning model, the output comprising an indication of the one or more dependencies.

In one embodiment, the processing device further executes the executable operation to cause a sequence of requests to be issued to the API of the computing server. The sequence of requests can be directed to the subset of the available endpoints. The processing device further receives a sequence of responses to the sequence of requests, and extracts data from the sequence of responses and storing the data for use in future operations.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to determining inferred dependencies between resources in an application programming interface (API). In one embodiment, resource inference is achieved by building a model of the probable server-side state of an application server that hosts the API and then using that model in a system to inform future requests to the server. The responses to requests can be run through an input analysis engine to refine the model and better-inform future requests. The API is made up of one or more endpoints that each specifies an addressable location that provides one or more services, such as performing a subroutine, or querying a resource. Endpoints provide connection points to the API that allow other systems to access its functionality and can be expressed, for example, in terms of uniform resource identifiers (URIs). The model includes inferred dependencies between those endpoints, and thus, can represent, the expected behavior of the API based on the probable state. Such an approach allows for understanding of the operation of a third-party API, and provides the ability to make an assessment of its suitability for the intended purpose, whether security vulnerabilities are present, etc. The determination of the inferred dependencies, as described herein prevents the need for human intervention to test the business logic of the API, and allows for more efficient and less-resource intensive testing than a brute-force approach where every possible API endpoint is identified and tested manually. Additional details with respect to determining inferred dependencies between resources are provided below.

Figure 1:
FIG. 1 is a block diagram illustrating a network environment for determining inferred dependencies between resources in an API in accordance with some embodiments of the present disclosure.
Figure 1:
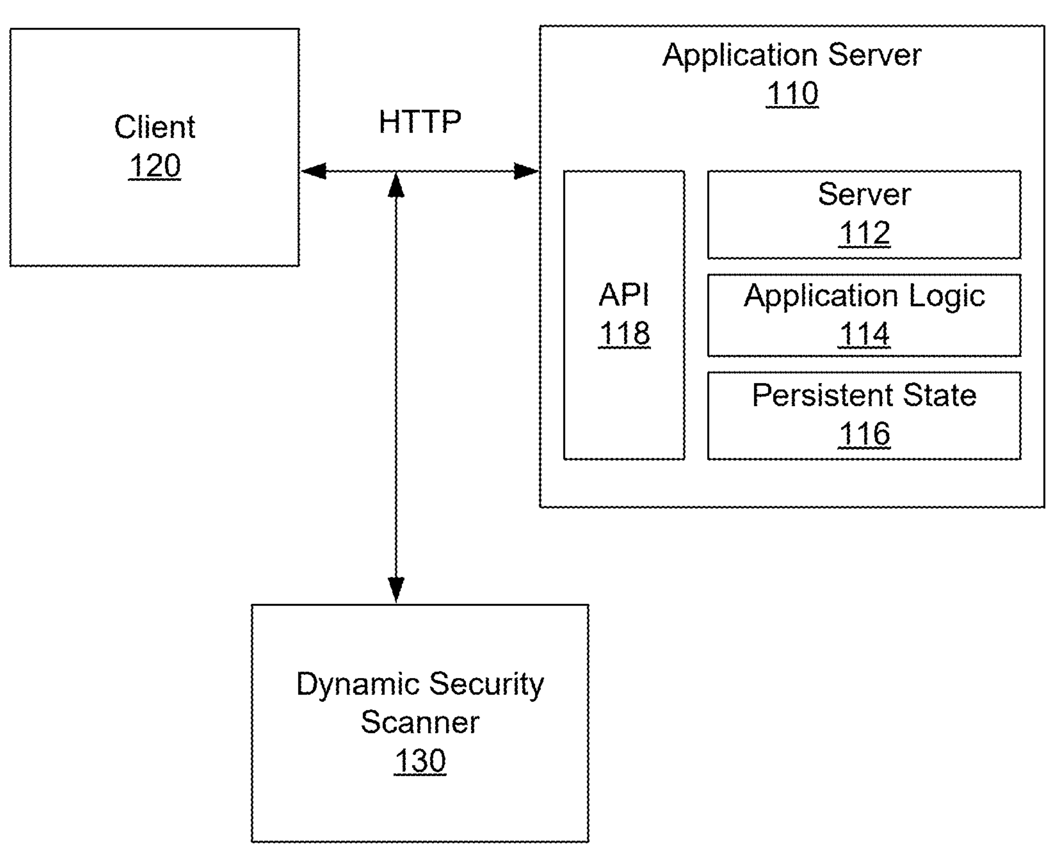

FIG. 1 is a block diagram illustrating a network environment for determining inferred dependencies between resources in an application programming interface (API) in accordance with some embodiments of the present disclosure. In one embodiment, the network environment 100 includes application server 110, client 120, and dynamic security scanner 130. In one embodiment, application server 110, client 120, and dynamic security scanner 130 are connected over a network or other connection and communicate using certain networking protocols (e.g., Hypertext Transfer Protocol (HTTP) messages). An illustrative communications network is the Internet; however, other networks may be used. The network may also be described as a data network or as a communication network and may be composed of multiple connected sub-networks. The network can be a local-area network (LAN), such as a company intranet, a metropolitan area network (MAN), a wide area network (WAN), an inter-network such as the Internet, or a peer-to-peer network (e.g., an ad hoc WiFi peer-to-peer network). The network may be any type and/or form of network and may include any of a point-to-point network, a broadcast network, a wide area network, a local area network, a telecommunications network, a data communication network, a computer network, an asynchronous transfer mode (ATM) network, a synchronous optical network (SONET), a wireless network, an optical fiber network, and a wired network. In some implementations, there are multiple networks between computing devices. The network may be public, private, or a combination of public and private networks. The topology of the network may be a bus, star, ring, or any other network topology capable of the operations described herein.

In one embodiment, the application server 110 is a server computing device configured to host one or more applications. Client device 120 can access those applications remotely over the network. An application, for example, can include a three-layered stack comprised of a web server layer 112, an application logic layer 114, and a persistent state layer 116. The web server layer 112 can be responsible for handling HTTP requests and delivering content to clients, such as client device 120. It can interact with users and server as a gateway between the client device 120 and the application logic layer 114 to receive incoming requests and route them to the appropriate components of application server 110. The application logic layer 114 contains the core business logic of the application and processes the requests received from the web server layer 112. The application logic layer 114 can perform the application's functionality and orchestrate different tasks, which can vary depending on the specific function of the application. The persistent state layer 116 manages storing and retrieving data required by the application and can utilize, for example, a database or any other persistent storage mechanism. The persistent state layer 116 further maintains a persistent state of the application in the form of a collection of discrete objects.

In one embodiment, the application publishes an Application Programming Interface (API) 118 as an interface for client 120 to interface with the application on application server 110. For example, client 120 can call the API published by the application to access the application logic 114 and/or determine the persistent state of the application. Illustrative examples of a client device 120 include, but are not limited to, a laptop, desktop, tablet, electronic pad, personal digital assistant, smart phone, video game device, television, kiosk, or portable computer.

Depending on the embodiment, the client device 120 or some other intermediate (i.e., separate) network device may employ dynamic security scanner 130 to analyze the HTTP messages sent between application server 110 and client device 120. The dynamic security scanner 130 may not have direct access to the target (i.e., the application running on application server 110) or to the target state, and thus may perform an analysis which can be referred to as "black box testing." In one embodiment, the analysis performed by dynamic security scanner 130 includes resource inference, or specifically determining dependencies between resources, which allows dynamic security scanner to gain increased depth of coverage.

When testing a system, dynamic security scanner 130 can make a number of probing requests and analyze the responses to understand the server state. Initially this is done with little knowledge about the underlying server state (i.e., the "persistent state" which includes a collection of discrete objects maintained by the server 110. Additional details pertaining to the determination of inferred dependencies by dynamic security scanner 130 are described below.

Figure 2:
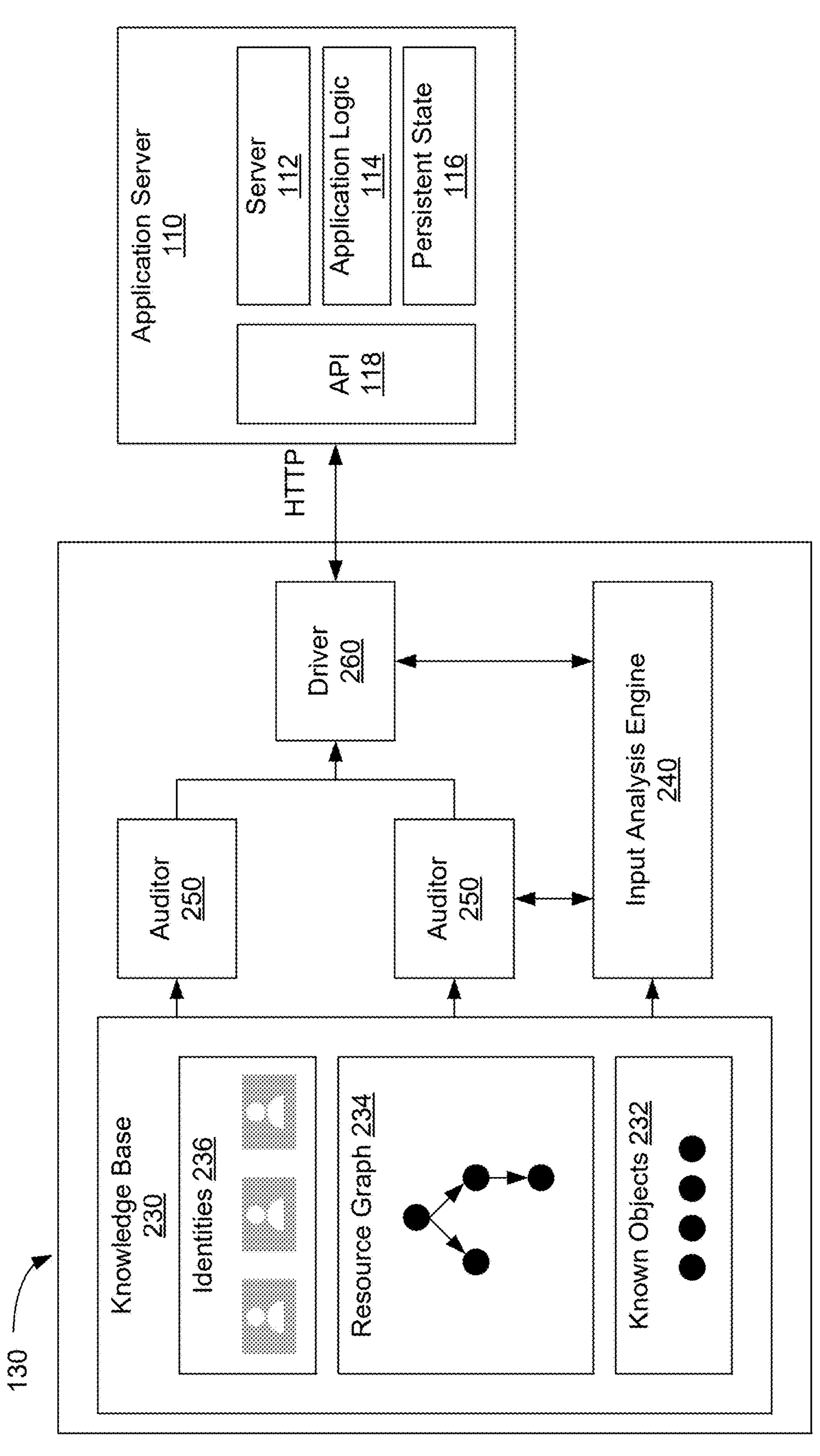
FIG. 2 is a block diagram illustrating a dynamic security scanner for determining inferred dependencies between resources in an API in accordance with some embodiments of the present disclosure.

FIG. 2 is a block diagram illustrating a dynamic security scanner for determining inferred dependencies between resources in an API in accordance with some embodiments of the present disclosure. In one embodiment, the dynamic security scanner 130 includes storage for a generated knowledge base 230, an input analysis engine 240, one or more auditors 250, and an output request driver 260. While these can share data between them, they can be architected to be independent and allow for underlying data structures or algorithms to be substituted without affecting the structure or algorithms of other components. Depending on the embodiment, the individual components could be implemented within the same application or could span boundaries, such as process or network.

In one embodiment, the dynamic security scanner 130 can perform the analysis of the HTTP messages sent to the application(s) on application server 110 and build a knowledge base 230. This knowledge base 230 can include a list, or other data structure, of known objects 232. Objects with similar structure can be arranged into classes known as resources. The resources can form a directed graph structure (i.e., the resource graph 234) based on ownership. There is a set of operations that can be performed on each object (e.g., create, read, update, delete). Authorization can be used to verify if a client with a given identity (e.g., as represented in "Identities 236") has permission to perform an operation on a given object.

The one or more auditors 250 can verify if a property of the system holds by sending a sequence of requests via the output request driver 260 and observing the responses to those requests. Requests can be represented as functions that take an application state as input and output a new one. As knowledge increases the dynamic security scanner 130 can increase the confidence that a future request will succeed by referencing only known object identifiers. This can result in increased efficiency and the ability to test portions of the target application running on application server 110 that have prerequisites such as referencing a valid object identifier. Such portions represent the significant majority of a target application and are thus relevant to an in-depth security scan that exercises all available application and business logic.

In one embodiment, resource inference is achieved by building a model of the probable server-side state of application server 110 and then using that model in a system to inform future requests to the server 110. The responses to requests are run through input analysis engine 240 to refine the model and better-inform future requests. This allows mistakes or mischaracterizations to be corrected and accuracy to improve as the system runs. In addition, a model can optionally be serialized and stored to a disk or network medium to be reused later.

In one embodiment, the dynamic security scanner 130 includes a resource inference storage engine (not shown), which is responsible for storing the model in knowledge base 230 and retrieving data based on queries against the model. Such a processing engine can take on many different embodiments, and can allow for the querying of a resource shape (i.e., a collection of associated attributes) in an API, associated known objects and their identifiers, and any detected links between resources. This can be achieved an in-memory list, a hash map, a relational or no-SQL database, or through a graph data structure of nodes/edges, such as resource graph 234. The storage engine implementation can be chosen based on performance trade-offs such as in-memory/on-disk storage size or read/write computational speed/complexity. The choice of a storage engine can be made based on theoretical performance analysis, operational performance observed on the system, or a hybrid of the two.

Input analysis engine 240 is responsible for writing new data to the storage engine in order to refine the model. Incoming responses to requests that are being made by the dynamic security scanner 130 are sent through the input analysis engine 240. One embodiment of such an engine is passive, however, a more active embodiment of the input analysis engine 240 can create its own requests that it would like to be sent to probe specific information. These probes could either gather general information such as requesting all objects of a specific resource or determine whether a specific property of the system holds, such as whether an object with a specific ID exists.

The analysis of request can be performed in a number of embodiments. One embodiment is by example where links between resources are inferred based on the ordering of the successful requests/responses. The initial request ordering could be generated from examples or documentation of an API. If a specific action on resource A is performed before an action on resource B, a link between them could be inferred. Such a link could indicate that resource A is potentially related to resource B, and this property could be confirmed by a future request probe.

A different embodiment for analysis of a request includes using a set of heuristics. These heuristics can use the properties or context of a response to determine probable resource links. For example, one heuristic can be that an object in a response with an "ID" or "id" field contains the identifier for that object, which can be stored in the knowledge base 230 as part of identifies 236. Another heuristic could use the name of the field, such as "user_id", to determine that a "User" resource is being referenced with a specific ID. This informs both a specific ID of a User resource that can be stored for later, and also a link between a "User" resource and the containing resource. Yet another heuristic can use the request path. It is common in REST APIs to generate paths that represent links or embedded resources, for example "/users/5/albums/2/tracks/15" would represent a "Track" with ID 15, which belongs to an "Album" with ID 2, which belongs to a "User" with ID 5.

Another embodiment for analysis of a request includes using a machine learning system. Such a system can make predictions for links between resources, and then test them to determine the accuracy of such predictions. Some facets to be fed into the machine learning system include the context, full API documentation, or other data around the API and how it is used. Such a machine learning system could be thought of as a refined brute force search. For example, the dynamic security scanner can apply a corresponding API specification, or other related information, as an input to a trained machine learning model and can receive, as an output of the trained machine learning model, an indication of the one or more dependencies between the endpoints of the API.

In one embodiment, auditors 250 are responsible for building requests to verify a specific property of an API, server, or target system and then verifying responses to determine if they conform to the desirable properties. In one embodiment, auditors 250 can interact with the storage engine to query for valid object IDs for use when building requests. When building a request, the auditors 250 can provide data for a resource's fields. In a REST API it is common for actions on a resource to require its ID, as a path parameter and/or provided in the body of a request. For fields that represent links between resources the checker can query for known existent IDs of the linked resource to provide. Another embodiment can use linked API actions for creating resources in order to generate known object IDs. Alternatively, an embedded resource can be provided, depending on the shape of the field which could be a scalar ID value or a full embedded object. Such a shape is determined from the API specification or from examples previously analyzed by the input analysis engine 240.

In one embodiment, the output request driver 260 is responsible for sending requests and retrieving the associated response from the target application on application server 110. In one embodiment, the output request driver 260 uses the lifecycle of a resource to determine the optimal ordering in which to send requests, or warn if a request would invalidate a future request. For example, a REST API application may provide actions to create a resource, retrieve an existing resource by ID, update a resource by ID, and delete a resource by ID. In such REST APIs it is common for the HTTP verb to determine the action: POST requests will create or update resources, GET requests will retrieve resources, PUT/PATCH requests will update resources, and DELETE requests will delete resources. The output request engine can defer requests that use the DELETE HTTP verb until after all other requests as it would expect that after a resource is deleted it would no longer be valid or retrievable by the API. Furthermore, it could defer GET requests until after POST requests to ensure that the expected object exists. Deferred requests can be stored in a data structure such as a priority queue, with a priority assigned on the verb of the request and whether there are other prerequisites as specified by object links or known objects which it can query from the storage system. While REST API semantics can be used in one embodiment, another embodiment may use machine learning or trial and error to build a model of prerequisites or restrictions on the ordering of API requests.

Figure 3:
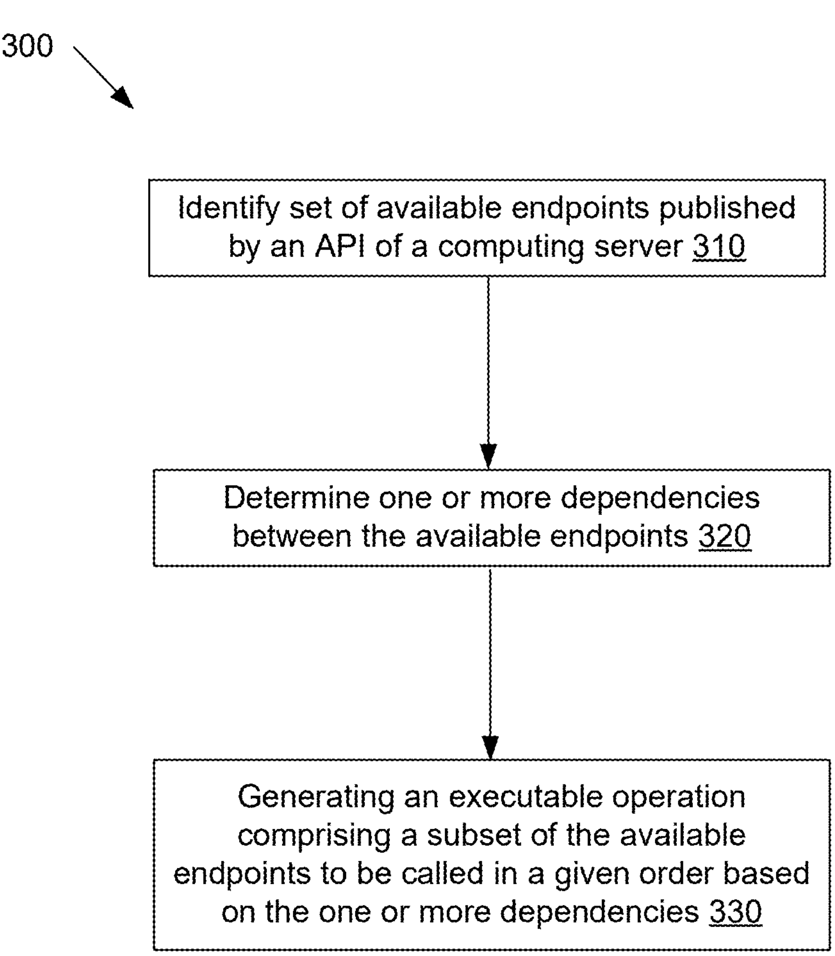
FIG. 3 is a flow diagram illustrating a method for inferring dependencies between resources in an API in accordance with some embodiments of the present disclosure.

FIG. 3 is a flow diagram illustrating a method for inferring dependencies between resources in an API in accordance with some embodiments of the present disclosure. The method 300 may be performed by processing logic that includes hardware (e.g., circuitry, dedicated logic, programmable logic, microcode, etc.), software (e.g., instructions run on a processor to perform hardware simulation), or a combination thereof. In one embodiment, method 300 may be performed by dynamic security scanner 130, as shown in FIG. 1 and FIG. 2.

Referring again to FIG. 3, at operation 310, the processing logic identifies a set of available endpoints published by an application programming interface (API), such as API 118, of a computing server, such as application server 110. In one embodiment, responsive to a query of the API specification, for example, the dynamic security scanner 130 receives a list of the available endpoints. Each endpoint, which can have a unique identifier, such as a Uniform Resource Locator (URL) or Uniform Resource Identifier (URI), serves as a gateway to interact with a corresponding web application or service. Each endpoint is thus a point of entry for client applications to access the functionality provided by the application or service. Each API endpoint may define the structure and rules of communication, specifying how the client application is to request data or perform actions through HTTP methods such as GET, POST, PUT, DELETE, etc. When a client application wants to retrieve data or perform an action from the web application or service, it can send an HTTP request to the API endpoint with specific parameters and data. The web application or service then processes the request, performs the necessary operations, and sends back an HTTP response containing the requested data or the result of the action. In certain circumstances, as described herein, the specific parameters, or perhaps the types of input accepted for those parameters, are not known to the client application, thereby preventing the client application for making an effective request of the API endpoint.

At operation 320, the processing logic determines one or more dependencies between the available endpoints. These dependencies can exist when the response to a request made to one endpoint includes parameter information that can be used in a request made to another endpoint. For example, if there is a desire to make a request to a first endpoint that requires a value for a given parameter, but that value is not known, a request to a second endpoint can be made, and response received that includes the value for the given parameter. When the parameter value is known, the request to the first endpoint can be made successfully. Thus, a dependency can exist between the first endpoint and the second endpoint. In order to determine the one or more dependencies, dynamic security scanner 130 can issue a series of requests to different endpoints of the API and record an indication of the information obtained in response to the requests. The received results can be used to build the resource graph 234 illustrating the dependencies between endpoints.

Suppose, for example, that an example API includes the following endpoints:

POST/api/pets

GET/api/pets/{petId}

In this example, pet objects have just two keys: id and name. As shown above, the second endpoint requires the parameter of "petId" for a request to be made. In the API specification it may be specified that "petId" is an integer, however, there may not be any additional information to further constrain the set of values that can be used. An inference can be made from this API that if a request is sent to the first endpoint, the "petId" will be received in the response, and can be used in a request to the second endpoint. Thus, given an API specification, one goal is to build a graph, such as resource graph 234, of producer-consumer dependencies between endpoints. Using this dependency graph the dynamic security scanner 130 can send requests to different endpoints of the API in an appropriate order to generate values that can be used for parameters. In this example, the first endpoint functions as a producer for the second endpoint.

In one embodiment, dynamic security scanner 130 can send a request to the first endpoint:

```
{
"name": "Fido"
}
```

and may receive the following response body:

```
{
"petId": 35,
"name": "Fido"
}
```

In view of the response, it is known that 35 is a valid choice for "petId" and can be used by auditors 250 when sending requests to the second endpoint above. In one embodiment, dynamic security scanner 130 can update the list of known objects 232 and the resource graph 234 to indicate that the pet resource with the name Fido also has the "petID" 35. The dynamic security scanner 130 can repeat a similar process of issuing requests to different API endpoints, and by evaluating the responses to those requests, build the resource graph 234 for a given API specification.

At operation 330, the processing device generates an executable operation comprising a subset of the available endpoints to be called in a given order based on the one or more dependencies. Resource objects, such as those included in the list of known objects 232, can be generated dynamically on-demand as required by each audit performed by auditors 250. For each audit, the auditors 250 attempt to find a sequence that satisfies a resource's dependencies using the resource graph 234 by checking the endpoint mapping. If such a sequence is identified, it can be executed in order to get a set of parameter values. This will take the form of a map from parameters to concrete values. The dynamic security scanner 130 can use values from the map if available, otherwise it will fall back to the default behavior of generating a random value of the appropriate type. Upon completion of an audit the objects that were generated can be cleaned up by sending DELETE requests to the appropriate endpoints. This avoids cluttering the API application state and prevents the system from reaching service limits.

In one embodiment, in order to validate that the changes don't introduce any regressions in the behavior of the scan and that stateful scanning yields improved results, a number of different approaches can be used. One approach is to run scans on a fixed set of APIs, both with and without stateful scanning. If the set of vulnerabilities discovered on each API without stateful scanning is a subset of the set of vulnerabilities discovered with stateful scanning enabled, that can indicate that there are no regressions and that stateful scanning yields improved API coverage. In another embodiment, the number of 4 XX status codes observed in the requests for each scan type, which can be reflective of the quality of the scanning.

Figure 4:
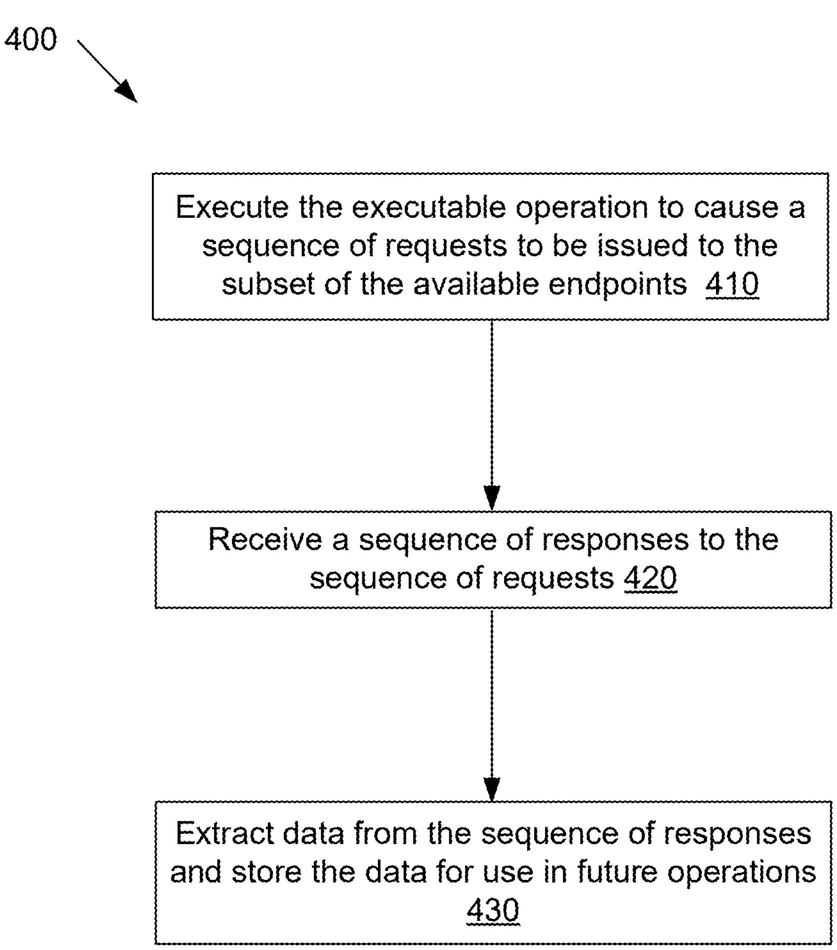
FIG. 4 is a flow diagram illustrating a method for testing an API using inferred dependencies between resources in accordance with some embodiments of the present disclosure.

FIG. 4 is a flow diagram illustrating a method for testing an API using inferred dependencies between resources in accordance with some embodiments of the present disclosure. The method 400 may be performed by processing logic that includes hardware (e.g., circuitry, dedicated logic, programmable logic, microcode, etc.), software (e.g., instructions run on a processor to perform hardware simulation), or a combination thereof. In one embodiment, method 400 may be performed by dynamic security scanner 130, as shown in FIG. 1 and FIG. 2.

Referring again to FIG. 4, at operation 410, the processing logic executes the executable operation to cause a sequence of requests to be issued to the API of the computing server, such as application server 110. In one embodiment, the sequence of requests is directed to the subset of the available endpoints of API 118. In one embodiment, the sequence of requests are selected in order to perform a designated action or actions associated with the operation. For example, the action may be to identify a number of pet objects in the database that meet certain criteria. In order to determine this number, it may be necessary to identify multiple parameter values, for example, such as "petID", an animal type, name, etc. As one or more of these parameter values may not be known, the dynamic security scanner 130 can issue the sequence of requests, based on the identified dependencies from resource graph 234, in a specific order, to obtain the various parameter values that are needed.

At operation 420, the processing logic receives, from the computing server, a sequence of responses to the sequence of requests. As each request is sent to the corresponding endpoint of API 118, dynamic security scanner 130 can receive a corresponding response that should include one or more of the needed parameter values.

At operation 430, the processing logic extracts data from the sequence of responses and stores the data for use in future operations. For example, the dynamic security scanner 130 can continuously evaluate the received responses to determine whether they include the expected parameter values. Input analysis engine 240 can compare the parameter values in the newly received responses with the previously received values in the knowledge base 230 and can update the sequence of requests in the executable operation as needed, such as if the behavior of the API endpoints has changed over time.

Figure 5:
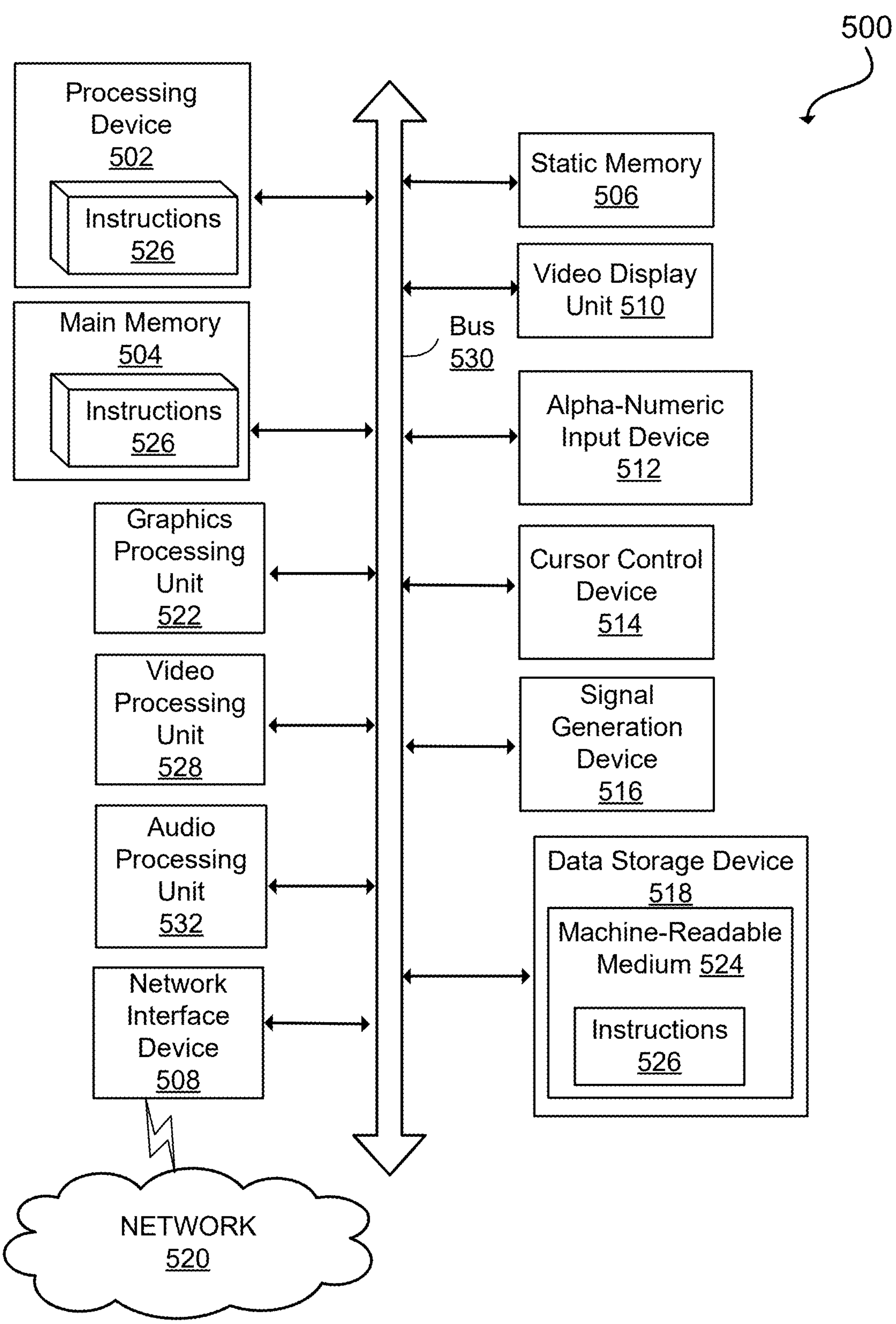
FIG. 5 is a block diagram illustrating an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

identifying a set of available endpoints published by an application programming interface (API) of a computing server;

determining one or more dependencies between the available endpoints without direct access to a persistent state of the computing server by building a model of a probable server-side state of the computing server based on responses to a series of probe requests sent to the available endpoints, wherein building the model comprises generating an inference, based at least in part on parameter values received in responses to the probe requests, the inference indicating that a first endpoint of the set of available endpoints produces a parameter value that a second endpoint of the set of available endpoints is to consume, wherein the one or more dependencies were previously unknown prior to the probe requests; and generating, by a processing device, an executable operation comprising a subset of the available endpoints to be called in a given order based on the one or more dependencies, wherein each at least one of the one or more dependencies represents the first endpoint of the set of available endpoints which is configured to provide a certain the parameter value in response to a first request and the second endpoint of the set of available endpoints which is configured to receive a second request including the parameter value.

2. The method of claim 1, wherein the set of available endpoints published by the API is received in response to a query of a corresponding API specification.

3. The method of claim 1, wherein determining the one or more dependencies between the available endpoints comprises:

storing the parameter values received in the responses to the series of probe requests in a resource graph of a knowledge base.

4. The method of claim 1, wherein determining the one or more dependencies between the available endpoints comprises using a number of heuristics related to the set of available endpoints.

5. The method of claim 1, wherein determining the one or more dependencies between the available endpoints comprises:

applying a corresponding API specification as an input to a trained machine learning model; and receiving an output of the trained machine learning model, the output comprising an indication of the one or more dependencies.

6. The method of claim 1, further comprising:

executing the executable operation to cause a sequence of requests to be issued to the API of the computing server, the sequence of requests directed to the subset of the available endpoints;

receiving, from the computing server, a sequence of responses to the sequence of requests; and extracting data from the sequence of responses and storing the data for use in future operations.

7. A system comprising:

a memory; and a processing device, coupled to the memory, and configured to perform operations comprising:

identifying a set of available endpoints published by an application programming interface (API) of a computing server;

determining one or more dependencies between the available endpoints without direct access to a persistent state of the computing server by building a model of a probable server-side state of the computing server based on responses to a series of probe requests sent to the available endpoints, wherein building the model comprises generating an inference, based at least in part on parameter values received in responses to the probe requests, the inference indicating that a first endpoint of the set of available endpoints produces a parameter value that a second endpoint of the set of available endpoints is to consume, wherein the one or more dependencies were previously unknown prior to the probe requests; and generating an executable operation comprising a subset of the available endpoints to be called in a given order based on the one or more dependencies, wherein each at least one of the one or more dependencies represents the first endpoint of the set of available endpoints which is configured to provide a certain the parameter value in response to a first request and the second endpoint of the set of available endpoints which is configured to receive a second request including the parameter value.

8. The system of claim 7, wherein the set of available endpoints published by the API is received in response to a query of a corresponding API specification.

9. The system of claim 7, wherein determining the one or more dependencies between the available endpoints comprises:

storing the parameter values received in the responses to the series of probe requests in a resource graph of a knowledge base.

10. The system of claim 7, wherein determining the one or more dependencies between the available endpoints comprises using a number of heuristics related to the set of available endpoints.

11. The system of claim 7, wherein determining the one or more dependencies between the available endpoints comprises:

applying a corresponding API specification as an input to a trained machine learning model; and receiving an output of the trained machine learning model, the output comprising an indication of the one or more dependencies.

12. The system of claim 7, wherein the processing device is configured to perform operations further comprising:

executing the executable operation to cause a sequence of requests to be issued to the API of the computing server, the sequence of requests directed to the subset of the available endpoints;

receiving, from the computing server, a sequence of responses to the sequence of requests; and extracting data from the sequence of responses and storing the data for use in future operations.

13. A non-transitory computer-readable storage medium storing instructions which, when executed, cause a processing device to perform operations comprising:

identifying a set of available endpoints published by an application programming interface (API) of a computing server;

determining one or more dependencies between the available endpoints without direct access to a persistent state of the computing server by building a model of a probable server-side state of the computing server based on responses to a series of probe requests sent to the available endpoints, wherein building the model comprises generating an inference, based at least in part on parameter values received in responses to the probe requests, the inference indicating that a first endpoint of the set of available endpoints produces a parameter value that a second endpoint of the set of available endpoints is to consume, wherein the one or more dependencies were previously unknown prior to the probe requests; and generating, by the processing device, an executable operation comprising a subset of the available endpoints to be called in a given order based on the one or more dependencies, wherein each at least one of the one or more dependencies represents the first endpoint of the set of available endpoints which is configured to provide a certain the parameter value in response to a first request and the second endpoint of the set of available endpoints which is configured to receive a second request including the parameter value.

14. The non-transitory computer-readable storage medium of claim 13, wherein determining the one or more dependencies between the available endpoints comprises:

storing the parameter values received in the responses to the series of probe requests in a resource graph of a knowledge base.

15. The non-transitory computer-readable storage medium of claim 13, wherein determining the one or more dependencies between the available endpoints comprises using a number of heuristics related to the set of available endpoints.

16. The non-transitory computer-readable storage medium of claim 13, wherein determining the one or more dependencies between the available endpoints comprises:

applying a corresponding API specification as an input to a trained machine learning model; and receiving an output of the trained machine learning model, the output comprising an indication of the one or more dependencies.

17. The non-transitory computer-readable storage medium of claim 13, wherein the instructions cause the processing device to perform operations further comprising:

executing the executable operation to cause a sequence of requests to be issued to the API of the computing server, the sequence of requests directed to the subset of the available endpoints;

receiving, from the computing server, a sequence of responses to the sequence of requests; and extracting data from the sequence of responses and storing the data for use in future operations.

18. The non-transitory computer-readable storage medium of claim 13, wherein the set of available endpoints published by the API is received in response to a query of a corresponding API specification.

* * * * *